(12) United States Patent
Barth

(10) Patent No.: US 8,614,553 B2
(45) Date of Patent: Dec. 24, 2013

(54) ILLUMINANT OPERATING APPLIANCE WITH POTENTIAL SEPARATION

(75) Inventor: Alexander Barth, Alberschwende (AT)

(73) Assignees: Tridonic GmbH and Co KG, Dornbirn (AT); Tridonic AG, Ennenda (CH)

( * ) Notice: Subject to any disclaimer, the term of this patent is extended or adjusted under 35 U.S.C. 154(b) by 270 days.

(21) Appl. No.: 13/127,843

(22) PCT Filed: Nov. 4, 2009

(86) PCT No.: PCT/EP2009/007907
§ 371 (c)(1),
(2), (4) Date: May 5, 2011

(87) PCT Pub. No.: WO2010/051984
PCT Pub. Date: May 14, 2010

(65) Prior Publication Data
US 2011/0210681 A1  Sep. 1, 2011

(30) Foreign Application Priority Data
Nov. 5, 2008 (DE) .......................... 10 2008 055 862

(51) Int. Cl.
*H05B 37/02* (2006.01)

(52) U.S. Cl.
USPC ........... 315/299; 315/276; 315/297; 315/302; 315/307

(58) Field of Classification Search
USPC .......... 315/276, 291, 294, 297, 299–302, 307
See application file for complete search history.

(56) References Cited

U.S. PATENT DOCUMENTS

| 5,907,223 | A | 5/1999 | Gu et al. |
| 6,181,079 | B1 | 1/2001 | Chang et al. |
| 6,556,457 | B1 | 4/2003 | Shimazaki et al. |
| 6,563,718 | B1* | 5/2003 | Li et al. ........................... 363/16 |
| 2005/0218838 | A1* | 10/2005 | Lys ................................ 315/291 |
| 2006/0066258 | A1 | 3/2006 | Lane et al. |
| 2006/0125417 | A1* | 6/2006 | Mosebrook et al. .......... 315/291 |
| 2006/0202640 | A1* | 9/2006 | Alexandrov ................... 315/291 |
| 2006/0284568 | A1 | 12/2006 | Chang et al. |

(Continued)

FOREIGN PATENT DOCUMENTS

EP  1473976 A1  11/2004

OTHER PUBLICATIONS

Chen et al., "High Speed Digital Isolators Using Microscale On-Chip Transformers," English translation of Abstract, retrieved at <<http://www.datasheetarchive.com/datasheet-pdf/03/DSA0038500.html>>, Elektronik magazine, Jul. 22, 2003, pp. 1-2.

(Continued)

*Primary Examiner* — Jason M Crawford
(74) *Attorney, Agent, or Firm* — Lee & Hayes, PLLC

(57) ABSTRACT

An operating device for operation of at least one illuminant, such as one or more LEDs, includes first and second converters and first and second logic circuits. The first converter is supplied directly or indirectly with mains voltage, with a first reference potential. The second converter is galvanically isolated from the first converter, with a second reference potential for supplying a load circuit with the illuminant. The first logic circuit is for controlling the first converter, and the second logic circuit is for controlling the second converter. The first logic circuit and the second logic circuit are connected to one another, with potential isolation, via an interface.

18 Claims, 5 Drawing Sheets

(56) References Cited

U.S. PATENT DOCUMENTS

Figure 1:
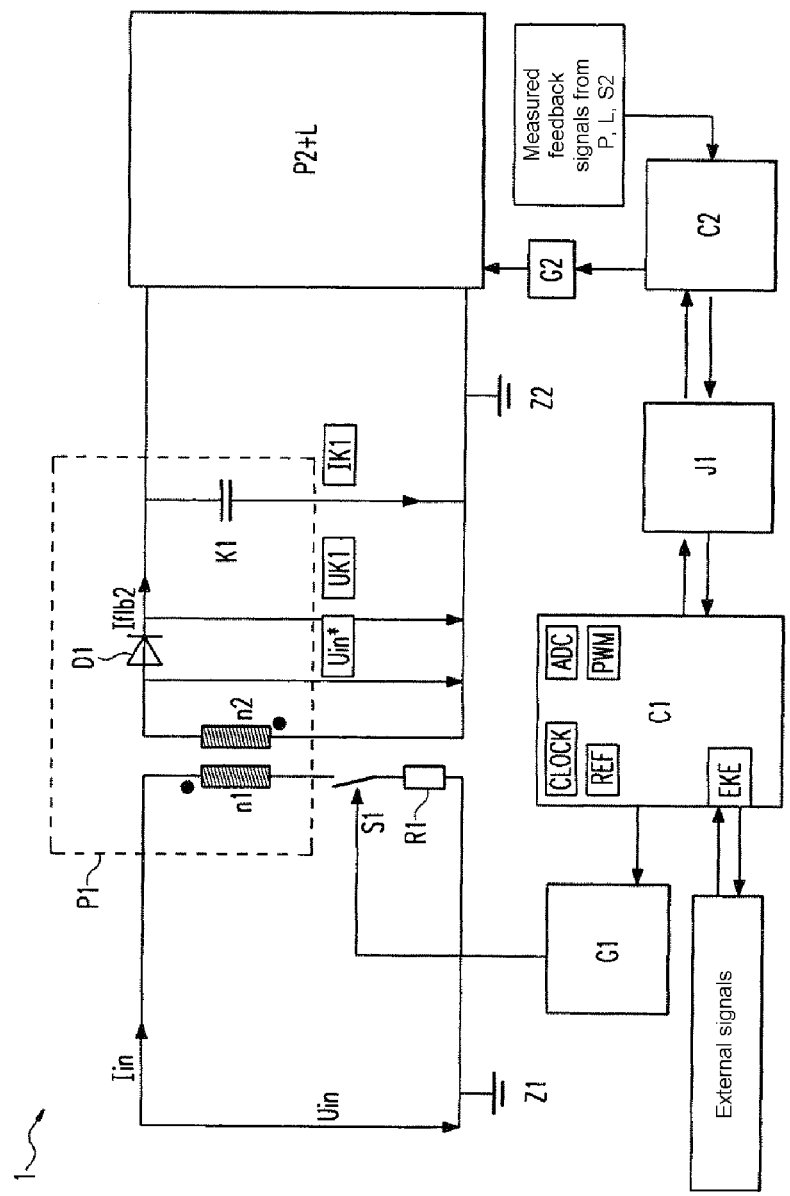

| | | | |
|---|---|---|---|
| 2007/0070659 A1* | 3/2007 | Sawtell | 363/21.01 |
| 2007/0194722 A1* | 8/2007 | Bruekers et al. | 315/291 |
| 2008/0018261 A1* | 1/2008 | Kastner | 315/192 |
| 2008/0192509 A1* | 8/2008 | Dhuyvetter et al. | 363/17 |
| 2010/0038965 A1* | 2/2010 | Rohner et al. | 307/66 |
| 2010/0060189 A1* | 3/2010 | Stevens et al. | 315/291 |
| 2010/0072966 A1* | 3/2010 | Mayell | 323/284 |
| 2010/0301766 A1* | 12/2010 | Zudrell-Koch et al. | 315/291 |

OTHER PUBLICATIONS

Patent Search Report PCT/EP2009/007907, dated Nov. 4, 2009, 5 pages.

* cited by examiner

ILLUMINANT OPERATING APPLIANCE WITH POTENTIAL SEPARATION

This Application is the National Stage of International Application No. PCT/EP2009/007907, filed Nov. 4, 2009, which claims foreign priority to German Application No. 10 2008 055 862.1, filed Nov. 5, 2008, both of which are incorporated herein by reference.

The present invention relates to the field of operating devices for illuminants, in particular to the field of operating devices for organic and inorganic light-emitting diodes (LEDs) or gas-discharge lamps.

It is already known that operating devices for illuminants have galvanic isolation between a low-voltage area and a high-voltage area of the device. In this case, in particular, two-stage operating devices are known, in which a converter which supplies the illuminant is operated with potential isolation via a control circuit on the mains voltage side (primary side of the potential isolation). If the invention is to feed feedback signals from the secondary side of the potential isolation, that is to say in particular from the area of the illuminant, to the control circuit, potential isolation is likewise provided for this feedback. The secondary side of the potential isolation is controlled by a further control circuit, which is isolated from the first-mentioned control circuit, which is at the mains voltage potential.

The object of the present invention is now to propose a circuit in particular for operation of organic and inorganic LEDs.

This object is achieved by the features of the independent claims. Advantageous developments of the invention are the subject matter of the dependent claims.

A first aspect of the invention relates to an operating device for operation of at least one illuminant, in particular of one or more LEDs, having:
- a first converter, which is supplied directly or indirectly with mains voltage, with a first reference potential,
- a second converter, which is galvanically isolated from the first converter, with a second reference potential for supplying a load circuit with the illuminant, in particular with one or more LEDs, and
- a first logic circuit for controlling the first converter, and a second logic circuit for controlling the second converter, wherein the first logic circuit and the second logic circuit are connected to one another, with potential isolation, via an interface.

The potential-isolated interface may be a bidirectional interface.

Furthermore, the potential-isolated interface may be in the form of an integrated coil, an integrated air-chord coil, an external transformer or a piezo transformer.

The first logic circuit, the second logic circuit and the potential-isolated interface may be integrated in an integrated circuit.

Measured values, states and/or control signals can be transmitted between the two logic circuits via the potential-isolated interface.

The operating device may have at least one circuit breaker, which is operated by the first and/or the second logic circuit, by which means the first and/or the second converter are/is clocked.

The first logic circuit may be designed to receive external commands, for example digital commands, in particular DALI (Digital Addressable Lighting Interface) commands or status information, and to transmit status information, in particular fault reports, via a communication unit.

The first logic circuit can control the first converter so as to produce active power factor correction with a clocked switch ("active PFC").

Primary-side operating parameter signals, which are at the first reference potential, can be fed back to the first logic circuit.

Secondary-side operating parameter signals, which are at the second reference potential, can be fed back to the second logic circuit.

The second logic circuit can be designed to operate the illuminant.

Feedback signals, in particular from the area of the load circuit, can be fed back to the second logic circuit such that actual values are evaluated for closed-loop control of the illuminant operation, and/or illuminant faults can be identified.

A further aspect of the invention relates to an operating device for operation of at least one illuminant, in particular an LED, having:
- a first converter, which is supplied with the mains voltage, at a first reference potential,
- a second converter, which is galvanically isolated from the first converter and has a second reference potential for supplying a load circuit with the illuminant, and
- a first logic circuit for controlling the first converter, and a second logic circuit for detection of measured values, wherein the first logic circuit and the second logic circuit are connected to one another via a potential-isolated interface.

A further aspect of the invention relates to an operating device for operation of at least one illuminant, in particular an LED, having:
- a converter, which is supplied with mains voltage, for supplying a load circuit with the illuminant, and
- a first logic circuit for controlling the converter, and a second logic circuit for detection of measured values, wherein the first logic circuit and the second logic circuit are connected to one another via a potential-isolated interface.

The converter may have an inductance, which is supplied with an input AC voltage, and a switch for controlling the charging and discharging of the inductance.

A further aspect of the invention relates to emergency lighting, which preferably has an illuminant, in particular one or more LEDs and an operating device of the type explained above. The failure of the mains voltage supply is preferably identified in order subsequently to operate the illuminant without delay on the basis of an autonomous voltage supply, in particular a battery.

A further aspect of the invention relates to a light, in particular for emergency lighting, which has an operating device of the type explained above.

A further aspect of the invention relates to an LED lamp, in particular an LED lamp for replacement of a conventional incandescent lamp, which has an operating device of the type explained above.

A further aspect of the invention relates to an integrated control unit, in particular an ASIC (Application-Specific Integrated Circuit), which is designed for an operating device of the type explained above.

Figure 2:
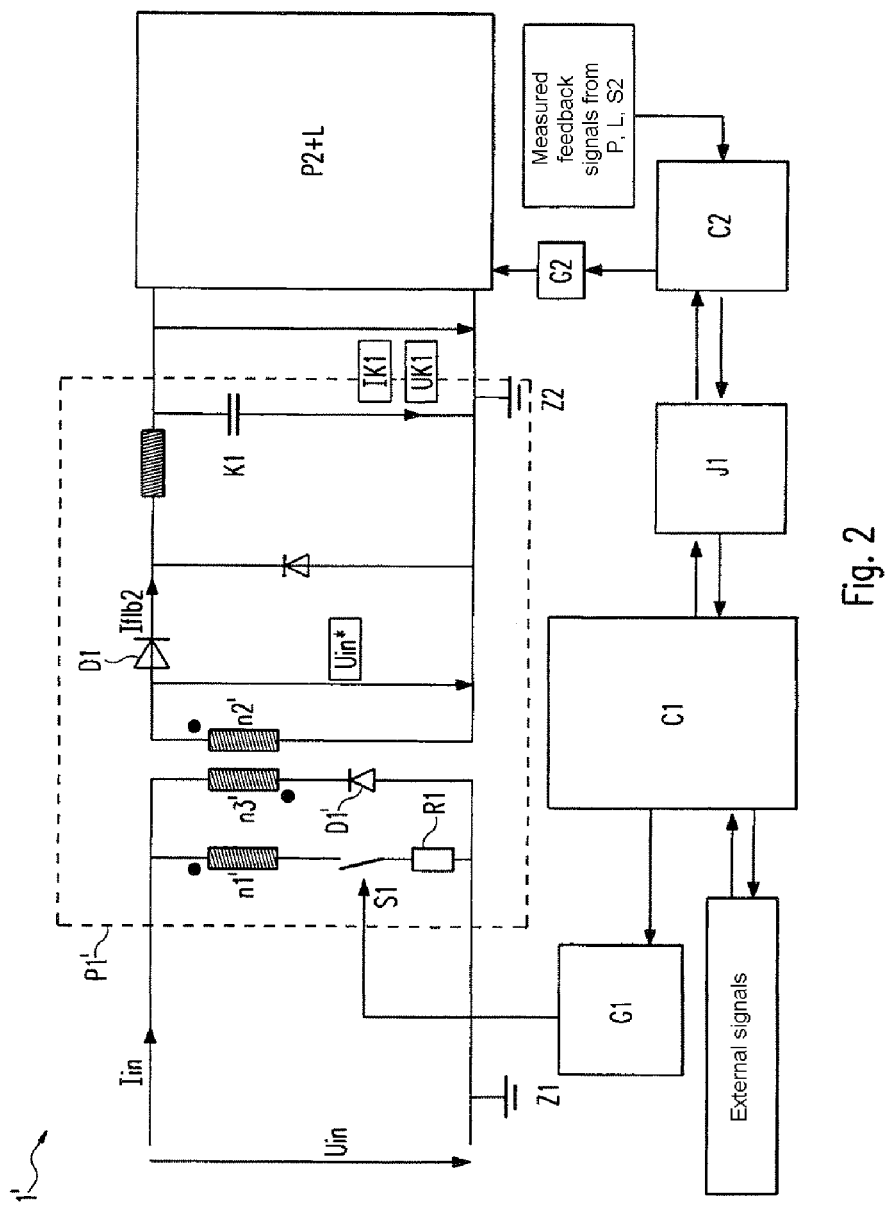
Figure 3:
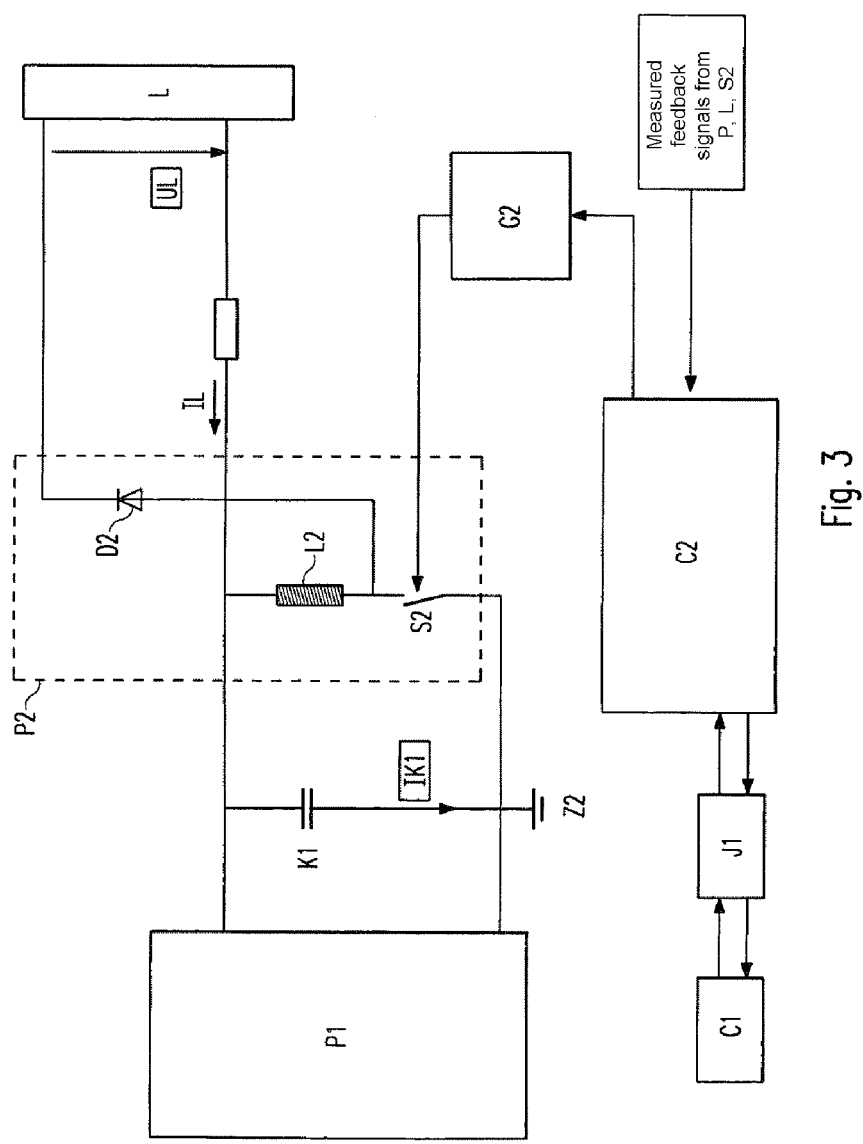
Figure 4:
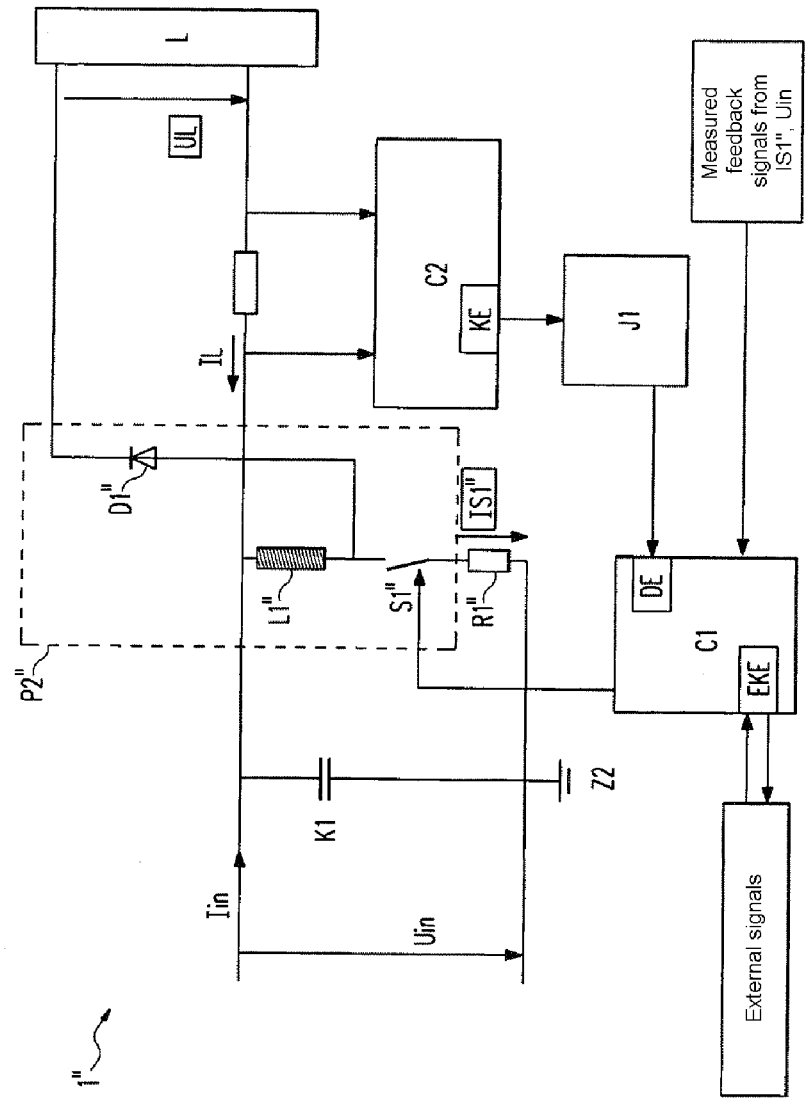

Further features and advantages of the invention will become clear when reading the following description of preferred embodiments, which refers to the drawing, in which:

FIG. 1 shows a schematic view of the operating device for illuminants according to one exemplary embodiment of the present invention, in which a first converter is in the form of a flyback converter, FIG. 2 shows a modification of the exemplary embodiment shown in FIG. 1, with the first converter being in the form of a forward converter, FIG. 3 shows an embodiment of the invention in which a second converter is in the form of a buck-boost converter, and FIG. 4 shows a further exemplary embodiment of the present invention.

Figure 5:
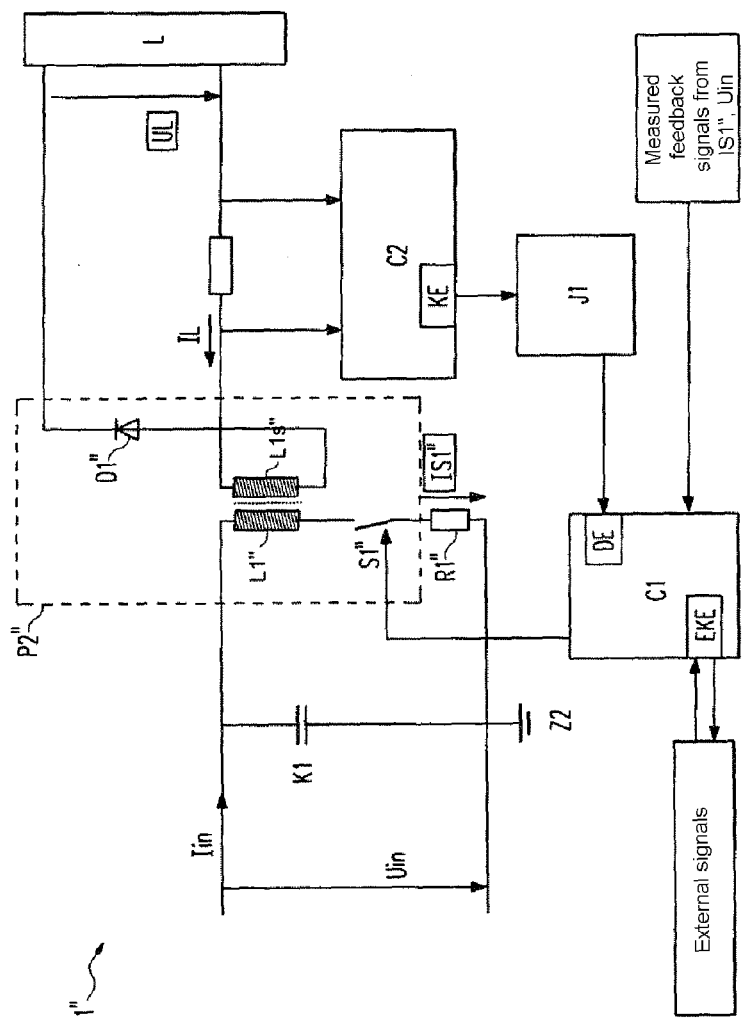

FIG. 5 shows a further exemplary embodiment of the present invention.

The operating device for illuminants, as illustrated in FIG. 1 and provided in general with the reference symbol 1, is a first exemplary embodiment according to the invention.

The operating device 1 is preferably intended for operation of an LED or of a plurality of LEDs. The operating device 1 is connected on the input side to a power supply system, which provides a mains supply voltage Uin and a mains supply current Iin.

As is illustrated in FIG. 1, the operating device 1 has, inter alia, a first converter or a first power conversion stage P1 and a second converter P2, which supplies a load circuit L with one or more illuminants, preferably LEDs. The first converter P1 has a reference potential Z1, and the second converter P2 has a reference potential Z2. FIG. 3 illustrates one particular embodiment of the second converter P2.

In the illustrated first exemplary embodiment, the converter P1 is formed by a so-called isolated flyback converter, which has a transformer with a primary winding n1 and a secondary winding n2. The energy made available from the mains supply voltage Uin can be transmitted in a known manner to the secondary side of the converter P1, by appropriately alternately opening and closing a controllable switch S1, and can be used to supply the second converter P2. By way of example, the switch S1 may be in the form of a transistor or a MOSFET transistor. In this case, power is transmitted when the switch S1 is open, in which case a diode D1 is furthermore provided for this purpose on the output side of the isolated flyback converter P1.

A first logic circuit, which is annotated C1 in FIG. 1, operates the switch S1 on the primary side of the first converter P1 and via a driver G1. The switch S1 is operated in a known manner by this logic circuit C1, for example by means of PWM (Pulse-Width Modulation) signals.

The mains voltage Uin is therefore applied to the primary side of the first converter P1, that is to say to the winding n1, and is converted to a voltage Uin* on the output side. A current Iflb2 is formed via a diode D1 and is used to charge an energy storage element K1, across which a voltage UK1 is produced. This energy storage element K1 may, for example, be a capacitor, for example an electrolytic capacitor, or a battery. The use of a battery will be explained in more detail below. A stabilized intermediate voltage UK1 is therefore produced across the energy storage element K1, and can be used to feed the second converter stage P2 and the load circuit L, to be precise the illuminant.

As already explained, a driver G1 is provided between the switch S1 and the preferably digital logic circuit C1 illustrated in FIG. 1. Alternatively or in addition to this, the logic circuit may also have an internal driver (not shown).

As can be seen in FIG. 1, the preferably digital integrated logic circuit C1 may be designed to receive external signals and to output signals via, for example, a connected bus line (not shown). By way of example, these signals may be commands (for example switch-on or switch-off commands or dimming level presets), or status information (in particular the information relating to a mains voltage failure when the invention is used for emergency lighting).

In consequence, a unit EKE is provided for external bidirectional communication in the first logic circuit C1. This unit EDE can be specifically designed to support a control protocol for controlling digital lighting operating devices, such as the DALI protocol (Digital Addressable Lighting Interface).

The first logic circuit C1 may also be designed to detect feedback signals from the primary side of the first converter P1 (not shown in FIG. 1). In particular, the input voltage Uin or else, by means of a measurement resistor R1 connected in series with the switch S1, the current through the switch S1 can also be detected and determined by the first logic circuit C1.

In addition to the first logic circuit C1, a second logic circuit C2 is also provided on the decoupled secondary side. This further logic circuit C2 is intended to detect feedback signals from the secondary side and, when appropriate, to also operate active elements on the secondary side (switches etc.), preferably via a driver G2. In this case, in particular, the feedback signals may originate from the area of the load circuit L, the area of a further switch for controlling the second converter P2, the area of the second converter P2, or the secondary side of the converter P1 (for example the voltage Uin*).

Preferably, galvanic isolation is not required for detection of such feedback signals, since these feedback signals are at the same reference potential as the logic circuit C2.

In particular, feedback signals which are evaluated as actual values for closed-loop control of the illuminant operation can be fed back to the logic circuit C2.

The two logic circuits C1, C2 are connected to one another via a potential isolation interface or an interface J1. The operating device 1 according to the invention therefore has two logic circuits C1, C2, which are potentially or galvanically isolated via the interface J1. Complete galvanic decoupling can therefore be ensured between the secondary side and the primary side, which is supplied with the mains voltage, of the operating circuit and driver circuit 1.

This interface J1 is preferably bidirectional. Signals can correspondingly be transmitted from the first logic circuit C1 to the second logic circuit C2. For example, the second logic circuit C2 can then operate active elements on the secondary side, depending on external commands supplied from the first logic circuit C1.

However, signals can also be transmitted in the opposite direction between the logic circuits C1, C2 via the interface J1. As an example of this, feedback signals detected by the second logic circuit C2 can be passed on externally as status information via the interface J1 and via the first logic circuit C1.

Various information can be transmitted via the potential-isolated interface J1, such as measured values, states and/or control signals. The information may be transmitted asynchronously. However, multiplexing methods are preferably used, in order to make it possible to transmit a plurality of measured values, states or control signals at the same time via the respective physical channel between the interface J1 and the logic circuits C1, C2.

According to preferred embodiments of the invention, the logic circuits C1, C2 may be in the form of ICs (Integrated Circuits) or ASICs (Application-Specific Integrated Circuits), in particular in the form of a digital circuit.

According to further preferred embodiments, the logic circuits C1, C2 and the interface J1 are integrated in an IC (for example in a "multichip module"). By way of example, the interface J1 may be integrated in an IC such as this by means of an integrated air-chord coil. An air-chord coil allows radio-frequency transmissions between the logic circuits C1, C2.

The drivers G1 and/or G2 can optionally also be integrated in the IC. Radio-frequency transmission can be used for transmission via the interface J1 (for example in the MHz or GHz range).

However, the potential-isolating interface J1 may also be in the form of an external transformer (preferably without a core).

Furthermore, a piezo transformer can also be used as the potential-isolating interface J1. In a piezo transformer such as this, the primary and secondary sides are coupled purely mechanically.

Each logic circuit C1, C2 may have a clock CLOCK, an analogue/digital converter ADC, reference voltages, REF and a PWM driver. The components of the respective logic circuits C1, C2 are synchronized via the clock CLOCK. The logic circuits C1, C2 can be supplied with an operating voltage via an external voltage supply, or can generate this internally.

A plurality of analogue/digital converters ADC for the feedback signals, as well as a digitally operating control loop, are preferably arranged within the logic circuits C1 and C2. In this case, the control loop is responsible for operating and clocking the respective connected converter P1 or P2. This operation and clocking are preferably carried out by means of the PWM driver, by means of PWM signals.

These components are not necessarily provided in both logic circuits. In fact, the structure of one of the two logic circuits C1, C2 can be reduced to a very major extent. The minimum, or the core function, which each logic circuit C1, C2 must be able to handle, is to be able to decode and encode the normally radio-frequency-modulated transmission via the interface J1. All other components or control algorithms, for example for evaluation of measurement signals, can be concentrated in one of the two logic circuits C1, C2. Memories can also be concentrated on one of the two sides C1, C2.

In addition, only one of the two logic circuits C1, C2 preferably communicates externally. Correspondingly, only the first logic circuit C1 preferably has the unit EKE for external bidirectional communication. By way of example, this external communication unit EKE can be used, via a connected bus (not shown), to receive control signals or to output reports or status signals via the bus.

The power converter stage P1 may be designed in various ways. Apart from being in the form of an isolated flyback converter as shown in FIG. 1, it may, for example, be in the form of a forward converter or else some other potential-isolated converter circuits.

A further operating device 1' according to the invention will be explained with reference to FIG. 2. This exemplary embodiment differs from the first by the first converter stage P1' being in the form of a forward converter. This forward converter P1' is designed particularly for continuous operation (continuous mode).

In the converter P1', the primary side of a transformer with windings n1', n2' is therefore once again clocked via the switch S1. The two windings n1' and n2' are wound in the same sense, such that power is always transmitted whenever the switch S1 is switched on by the logic circuit C1.

For this purpose, a third winding n3' is also provided on the primary side and has a diode D1' connected in series with it, with the third coil n3' being wound in the opposite sense to the first coils n1' and n2'. This coil n3' is used to reduce the magnetization of the primary-side coil n1'.

FIG. 3 now shows one possible refinement of the second converter P2 in detail, which can be combined with an isolated flyback converter P1 as shown in FIG. 1 or with a forward converter P1' 2 as shown in FIG. 2.

By way of example, the second converter P2 may be in the form of a flyback converter or switched-mode regulator. The second converter P2 has a controllable switch S2 in series with an inductance L2, as well as a diode D2.

Current is made available in this way to the LED arrangement by the logic circuit C2 operating the switch S2 alternately via a driver G2, and this current is used to operate the LED arrangement. The voltage across the energy storage element K1 can be increased or decreased to a voltage which is suitable for operation of the illuminant in this way, by choice of the frequency and/or of the duty ratio for operation of the switch S2.

The driver G2 may optionally be integrated in the logic circuit C2 or may be in the form of a specific unit.

Galvanic isolation is not required for the logic circuit C2 to control the switch S2. Galvanic isolation is likewise not provided for the logic circuit C1 to control the switch S1. In other words, the switches S1, S2 are controlled by the logic circuits C1, C2 without potential isolation.

Possible feedback signals on the secondary side are the voltage drop UL across the LED arrangement as well as the current IL through the LED arrangement, and the current through the switch S2.

By way of example, dimming can be achieved by using PWM modulation to control the switch S2 on the secondary side.

The invention is not simply restricted to the described exemplary embodiments. It is also feasible, for example, for the first converter P1 to be a free-running flyback converter. According to the invention, only one switch is therefore required overall, either on the primary side or on the secondary side. The invention also correspondingly covers embodiments in which there is no switch for controlling the first converter P1, P1' or the second converter P2. In a variant such as this, control takes place only on one potential side of the switches S1, S2.

Emergency lighting will now be explained in more detail, as a typical example of the use of the invention.

When used for emergency lighting, the energy storage element K1 is a battery, which can be charged from the isolated flyback converter or forward converter, and supplies the illuminant arrangement for emergency lighting purposes.

When used for emergency lighting, the secondary-side mains voltage can be monitored by the second logic circuit C2 in order to identify the need for emergency lighting. In this case, the second logic circuit C2 may also detect different operating parameters on the secondary side of the emergency lighting device.

During a charging mode as an emergency lighting device, only the first converter P1 is normally active, in order to keep the battery charged. Emergency lighting operation is initiated only when an emergency state has occurred, with this being identified, in particular, by discrepancies between the secondary-side mains supply voltage Uin*, as shown in FIGS. 1 and 2, and the predetermined nominal values.

As an alternative to this, and instead of monitoring the mains voltage indirectly via the secondary-side means supply voltage Uin*, the mains voltage can also be monitored on the primary side. In this case, it is the first logic circuit C1 which directly detects the mains voltage Uin.

The second switch S2 is then alternatively switched on and off during emergency lighting operation. The duty ratio of switching on and off is appropriately adapted by the logic circuit C2 in order to set the level of the current supplied to the LED, and therefore the power with which the LED is operated.

The load L and the battery management are therefore controlled on the secondary side, while battery charging is controlled on the primary side. As already mentioned, the mains voltage can be monitored on the primary side or secondary side.

FIG. 4 now shows a further exemplary embodiment of an operating device 1" according to the invention.

The operating device 1" differs from the first exemplary embodiments by having only one converter P". Furthermore, the explanations provided in conjunction with the first exemplary embodiments apply in a corresponding manner to this exemplary embodiment of the operating device 1".

This converter P'" may be in the form of a power factor correction (PFC) circuit. The converter P'" is preferably an AC voltage/DC voltage power converter.

The input mains AC voltage Uin is filtered by a smoothing capacitor K1, and is supplied to an inductance L1", that is to say a coil. The inductance L1" together with a diode D1" forms a series circuit, which is connected between an input connection, to which the input AC voltage Uin is applied, and an output connection, where an output DC voltage UL is produced in order to supply the load circuit L.

A controllable switch S1" is connected to the connecting node between the inductance L1" and the diode D1".

When the switch S1" is switched on, then the inductance L1" is shorted to ground, and the diode D1" is reverse-biased. The inductance L1" is correspondingly charged, as a result of which energy is stored in the inductance L1".

In contrast, when the switch S1" is switched off, then the diode D1" is forward-biased, which leads to the inductance L1" then being able to discharge itself via the diode D1", preferably into a DC voltage capacitor (not shown).

The switch S1" is operated in a known manner by the first logic circuit C1. Various measurement signals from the input side of the converter P1' are supplied to the logic circuit C1. As is illustrated in FIG. 4, the logic circuit C1 is in this case supplied directly in particular with the mains input voltage Uin and, across a resistor R1" connected in series with the switch S1", the switch current IS1" as the input-side measurement variables.

The second logic circuit C2 is used to measure output-side feedback signals. In the exemplary embodiment shown in FIG. 4, the current IL through the load circuit L or through the illuminant arrangement is detected in the freewheeling path.

The measured values detected by the first logic circuit C1 and by the second logic circuit C2 may, in addition, also be state signals, which therefore preferably represent a 1-bit measured value.

The operating device 1" illustrated in FIG. 4 represents a reduced embodiment, in which the interface J1 is designed to be unidirectional. This comprises only potential-isolated detection of the current IL through the LEDs in this case. The second logic circuit C2 uses the encoding unit KE to encode the detected measured value for transmission via the interface J1. The first logic circuit comprises a corresponding decoding unit DE for receiving and decoding the signals transmitted via the interface J1.

Apart from the encoding unit KE, the second logic circuit C2 preferably has no further logic. All of the rest of the logic, including the unit for external bidirectional communication EKE, is concentrated in the logic circuit C1.

The circuit variant shown in FIG. 5 differs from the embodiment shown in FIG. 4 in that the inductance L1" is magnetically coupled to a secondary winding L1s". This embodiment is intended to demonstrate that the flyback converter principle used for the converter P' in FIG. 4 is not essential, but that a different switched-mode regulator principle can also be used instead of this.

The circuit variant illustrated in FIG. 5 represents one example of an isolated flyback converter principle. However, for example, the converter P" may also be formed by a resonant half-bridge with a transformer for potential isolation.

When using an isolated flyback converter principle, the inductance L1" can be replaced by an inductance L1" with a magnetically coupled secondary winding L1s", which therefore together form a transformer. In this case, the secondary winding L1s" can feed the load circuit L via a diode D1" and an optional energy-storage capacitor C1" (in parallel with the load circuit L, C1" is not illustrated). In addition, the inductance L1" can be magnetically coupled to a further output winding L13" (not illustrated).

In this case, during the phase when the switch S1" is switched on for example, the first logic circuit C1 can monitor the voltage drop across the resistor R1" as an actual value signal. In the switched-off phase, for example, when the first logic circuit C1 can determine the voltage across the inductance L1" and/or the zero crossing of the current through the inductance L1". By way of example, a resistor (not illustrated) can tap off the voltage at the junction point between the inductance L1" and the switch S1". The second logic circuit C2 can be used to tap off the current IL through the LED on the secondary side of the converter P1", and to transmit a corresponding signal via the interface J1 to the first logic circuit C1.

By way of example, this allows an operating device for an LED to be constructed in a very compact manner, such that, because of its compact design and the potential isolation provided, this operating device can be integrated very well in an LED lamp, that is to say by way of example an LED lamp for replacing a conventional incandescent lamp or an energy-saving lamp based on a fluorescent lamp. In this case, because of the compact design, the operating device can be arranged very well in the lamp cap of the LED lamp.

By way of example, the lamp cap of the LED lamp may be an E27 cap, a B22 cap, a GU4 or a GU10 cap.

The invention claimed is:

1. An operating device for operation of at least one illuminant, the operating device comprising:
   a first converter, which is supplied with the mains voltage at a first reference potential,
   a second converter, which is galvanically isolated from the first converter and has a second reference potential, for supplying a load circuit with the illuminant, and
   a first logic circuit for controlling the first converter, and a second logic circuit for controlling the second converter,
   wherein the first logic circuit and the second logic circuit are connected to one another via a potential-isolated interface.

2. The operating device as claimed in claim 1, wherein the potential-isolated interface is a bidirectional interface.

3. The operating device as claimed in claim 1, wherein the potential-isolated interface is in the form of an integrated air-cored coil, an external transformer or a piezo transformer.

4. The operating device as claimed in claim 1, wherein the first logic circuit, the second logic circuit and the potential-isolated interface are integrated in an integrated circuit.

5. The operating device as claimed in claim 1, wherein measured values, states and/or control signals are transmitted between the first logic circuit and the second logic circuit via the potential-isolated interface.

6. The operating device as claimed in claim 1, further comprising at least one circuit breaker, which is operated by the first logic circuit or the second logic circuit and clocks the first converter or the second converter, respectively.

7. The operating device as claimed in claim 1, wherein the first logic circuit is designed to receive external DALI (Digital Addressable Lighting Interface) commands or status information, and to transmit fault reports via a communication unit (EKE).

8. The operating device as claimed in claim 1, wherein the first logic circuit controls the first converter so as to produce active power factor correction.

9. The operating device as claimed in claim 1, wherein primary-side operating parameter signals, which are at the first reference potential, are fed back to the first logic circuit.

10. The operating device as claimed in claim 1, wherein secondary-side operating parameter signals, which are at the second reference potential, are fed back to the second logic circuit.

11. The operating device as claimed in claim 1, wherein the second logic circuit is designed to operate the illuminant.

12. The operating device as claimed in claim 1, wherein feedback signals from an area of the load circuit, are fed back to the second logic circuit such that actual values can be evaluated for closed-loop control of the illuminant operation, and/or illuminant faults can be identified.

13. An operating device for operation of at least one illuminant, the operating device comprising:
    a first converter, which is supplied with the mains voltage, at a first reference potential,
    a second converter, which is galvanically isolated from the first converter and has a second reference potential, for supplying a load circuit with the illuminant, and
    a first logic circuit for controlling the first converter, and a second logic circuit for detection of measured values,
    wherein the first logic circuit and the second logic circuit are connected to one another via a potential-isolated interface.

14. An operating device for operation of at least one illuminant, the operating device comprising:
    a converter, which is supplied with mains voltage, for supplying a load circuit with the illuminant, and
    a first logic circuit for controlling the converter, and a second logic circuit for detection of current through the illuminant,
    wherein the first logic circuit and the second logic circuit are connected to one another via a potential-isolated interface.

15. The operating device as claimed in claim 14, wherein the converter has an inductance, which is supplied with an input AC (Alternating Current) voltage, and a switch for controlling charging and discharging of the inductance.

16. An LED (Light Emitting Diode) lamp having an operating device as claimed in claim 14.

17. An emergency light having an operating device as claimed in claim 14.

18. An ASIC or μC control unit integrated with an operating device as claimed in claim 14.

* * * * *

UNITED STATES PATENT AND TRADEMARK OFFICE
CERTIFICATE OF CORRECTION

| | | |
|---|---|---|
| PATENT NO. | : 8,614,553 B2 | Page 1 of 1 |
| APPLICATION NO. | : 13/127843 | |
| DATED | : December 24, 2013 | |
| INVENTOR(S) | : Alexander Barth et al. | |

It is certified that error appears in the above-identified patent and that said Letters Patent is hereby corrected as shown below:

On the Title Page, change

Column 1, item 73, change "Tridonic GmbH and Co KG, Dornbirn (AT); Tridonic AG, Ennenda (CH)" to -- Tridonic GmbH and Co KG, Dornbirn (AT) --

Signed and Sealed this
Sixth Day of May, 2014

Michelle K. Lee
*Deputy Director of the United States Patent and Trademark Office*